(12) United States Patent
Mishra et al.

(10) Patent No.: US 12,335,133 B2
(45) Date of Patent: Jun. 17, 2025

(54) MULTICAST PATH TRACES

(71) Applicant: Cisco Technology, Inc., San Jose, CA (US)

(72) Inventors: Mankamana Prasad Mishra, San Jose, CA (US); Lukas Krattiger, The Woodlands, TX (US); Nitin Kumar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 356 days.

(21) Appl. No.: 18/088,239

(22) Filed: Dec. 23, 2022

(65) Prior Publication Data

US 2024/0214295 A1    Jun. 27, 2024

(51) Int. Cl.
*H04L 45/02* (2022.01)
*H04L 45/00* (2022.01)
*H04L 45/16* (2022.01)

(52) U.S. Cl.
CPC .............. *H04L 45/02* (2013.01); *H04L 45/16* (2013.01); *H04L 45/26* (2013.01)

(58) Field of Classification Search
None
See application file for complete search history.

(56) References Cited

U.S. PATENT DOCUMENTS

| | | | |
|---|---|---|---|
| 8,780,908 B2 | 7/2014 | Mentze et al. | |
| 9,608,898 B2 | 3/2017 | Venkataraman et al. | |
| 10,686,699 B2 | 6/2020 | Duncan et al. | |
| 11,139,995 B2 | 10/2021 | Zhang | |
| 11,902,049 B2* | 2/2024 | Xie | H04L 45/04 |
| 2011/0261703 A1* | 10/2011 | Luss | H04L 43/0882 370/252 |
| 2012/0308225 A1* | 12/2012 | Long | H04L 45/04 398/13 |
| 2015/0055652 A1* | 2/2015 | Yong | H04L 12/185 370/390 |
| 2015/0304420 A1* | 10/2015 | Li | G06F 21/10 709/201 |
| 2022/0094626 A1 | 3/2022 | Xu et al. | |
| 2024/0235985 A1* | 7/2024 | Geng | H04L 45/34 |

OTHER PUBLICATIONS

Asaeda, et al., "Mtrace Version 2: Traceroute Facility for IP Multicast", Request for Comments: 8487, Oct. 2018, 41 pages, IETF Trust.

* cited by examiner

*Primary Examiner* — Quang N Nguyen
(74) *Attorney, Agent, or Firm* — BEHMKE INNOVATION GROUP LLC; James M. Behmke; James J. Wong

(57) ABSTRACT

In one embodiment, a device may receive a multicast path trace request for a multicast tree, wherein the device is a mid-node in the multicast tree. The device may perform, based on the device being a mid-node in the multicast tree, an upstream trace of network topology of the multicast tree from the device to a head-node of the multicast tree and a downstream trace of network topology of the multicast tree from the device to at least one tail-node. The device may generate an end-to-end visible topology of the multicast tree based on the upstream trace and the downstream trace. The device may provide the end-to-end visible topology of the multicast tree to an observability manager.

20 Claims, 13 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Type  |      Length       |              Value....           |
+-+-+-+-+-+-+-+-+-+-+-+-+-+-+-+-+-+-+-+-+-+-+-+-+-+-+-+-+-+-+-+-+
```

FIG. 9

MULTICAST PATH TRACES

TECHNICAL FIELD

The present disclosure relates generally to computer systems, and, more particularly, to multicast path traces.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

For example, IP multicast is a popular method of one-to-many data distribution. Multicast data distribution involves transmitting a packet from a source to an arbitrary number of receivers by replicating the packet within the network at fan-out points along a multicast distribution tree rooted at the traffic's source. Accordingly, a packet may be received by multiple receivers across multiple branches of the multicast tree.

Multicast trees can be difficult to troubleshoot. For instance, there is no efficient and/or deterministic mechanism to identify the topology of a distribution tree in a node-agnostic manner. Instead, current techniques for route tracing in a multicast tree are directionally limited (e.g., upstream tracing only) and/or limited to receiver-to-source tracing beginning at a last hop router (LHR). As a result, the current path tracing techniques for multicast trees are not globally applicable across all nodes of the multicast tree and, therefore, are unable to provide visualization of the entire multicast tree from any part of the network

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 9 illustrates an example of a packet format for encoding multicast path tracing messages;

DESCRIPTION OF EXAMPLE EMBODIMENTS

Overview

According to one or more embodiments of the disclosure, a device may receive a multicast path trace request for a multicast tree, wherein the device is a mid-node in the multicast tree. The device may perform, based on the device being a mid-node in the multicast tree, an upstream trace of network topology of the multicast tree from the device to a head-node of the multicast tree and a downstream trace of network topology of the multicast tree from the device to at least one tail-node. The device may generate an end-to-end visible topology of the multicast tree based on the upstream trace and the downstream trace. The device may provide the end-to-end visible topology of the multicast tree to an observability manager.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
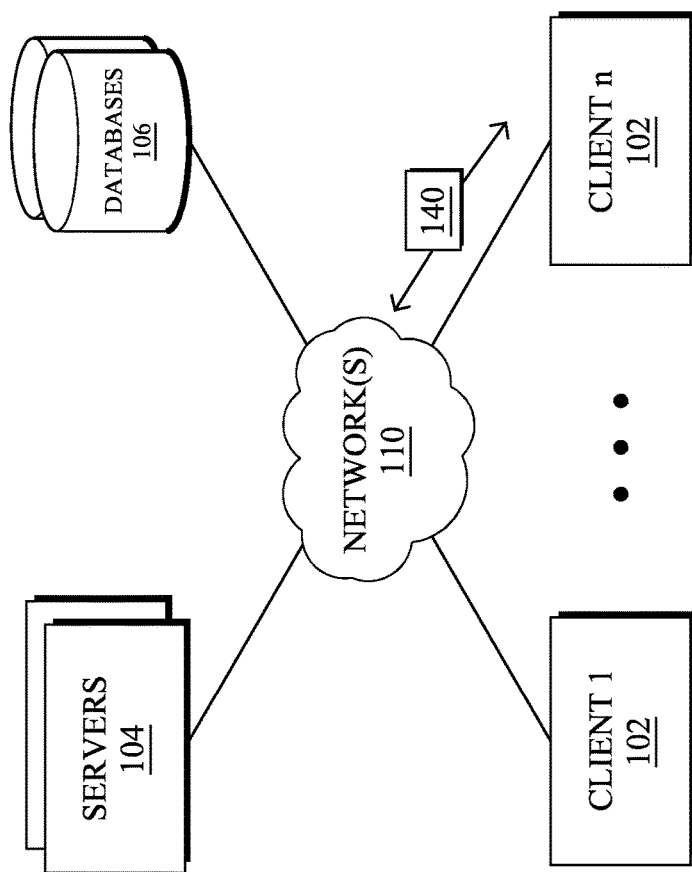
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
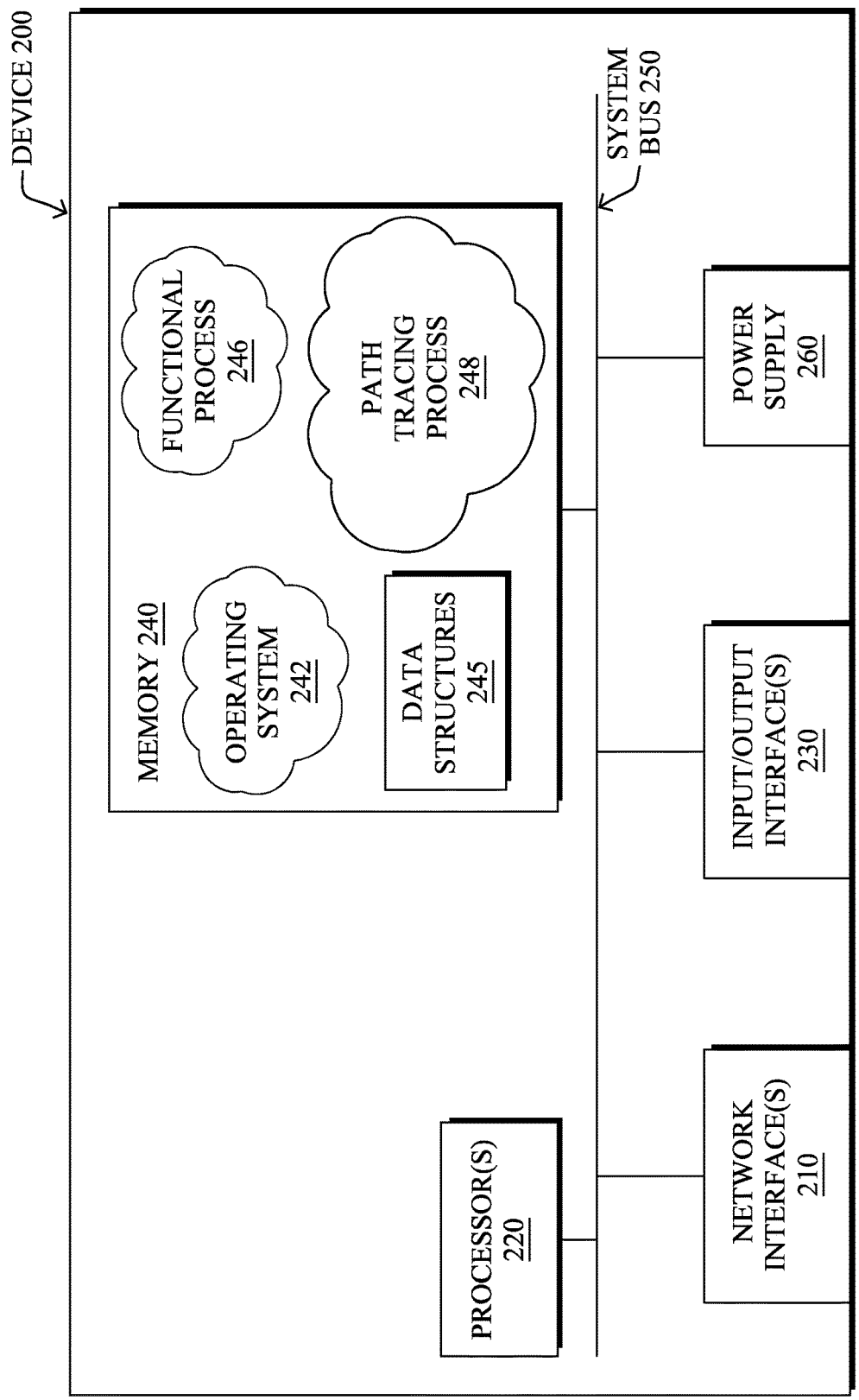
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "path tracing" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Observability Intelligence Platform—

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
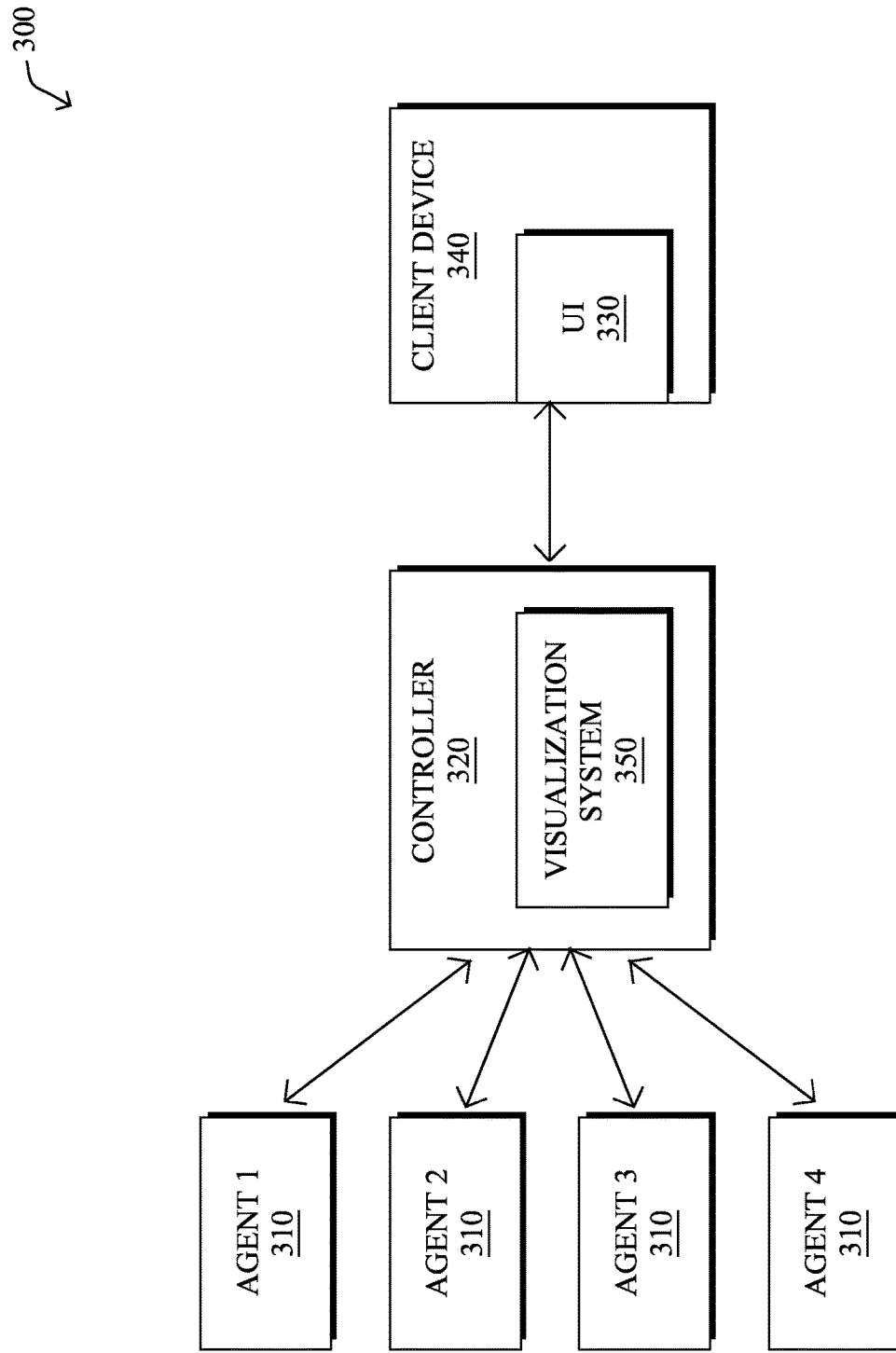
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller 320 instance may be hosted remotely by a provider of the observability intelligence platform 300. In an illustrative on-premises (On-Prem) implementation, a controller 320 instance may be installed locally and self-administered.

The controllers 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the eXtensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

Figure 4:
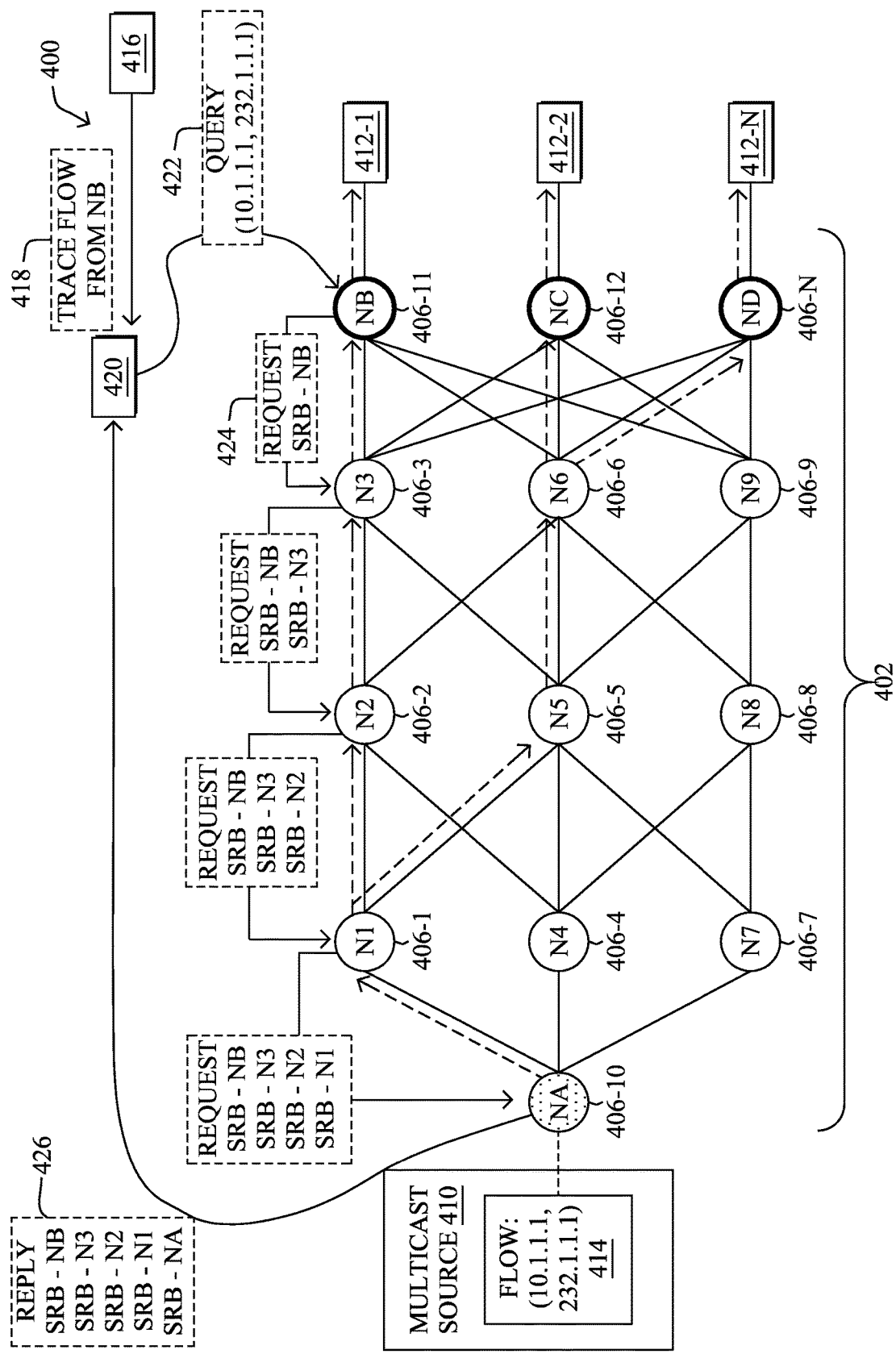
FIG. 4 illustrates a deployment of a limited multicast route tracing mechanism.

FIG. 4 illustrates a deployment 400 of a limited multicast route tracing mechanism. For example, limited multicast route tracing mechanism may include an Internet Engineering Task Force (IETF) Mtrace version 2 (Mtrace2) IP multicast traceroute facility (RFC 8487). Limited route tracing mechanism may be used to trace an IP multicast routing path within a multicast tree 402.

For example, a multicast tree 402 may include a plurality of nodes 406 (e.g., nodes 406-1 . . . 406-N). The nodes 406 may be network connection points such as electronic devices attached to a network that are configured for creating, receiving, and/or transmitting information over a communication channel 408. For example, each of the nodes 406 may be a switch, a router, a computer, a server, etc.

Each of the nodes 406 may be uniquely identifiable within the network so that information may be properly routed to a correct device. For example, each of the nodes 406 may be identifiable by a unique network address (e.g., IP address). Each of the nodes 406 may additionally, or alternatively, belong to, subscribe to, and/or be identifiable by a multicast group address.

In multicast tree 402, each of the nodes 406 may be interconnected by one or more communication channels 408 forming a communications web or network. Data may be communicated between given nodes 406 across branches of the multicast tree 402 that are uniquely identifiable by the sequence of particular nodes 406 and/or particular communication channels 408 across which it is propagated.

For instance, multicast tree 402 may include a source of multicast traffic, such as multicast source 410. The multicast source 410 may be located at the root of multicast tree 402. The multicast source 410 may send a multicast traffic flow 414 to one or more receivers 412 (e.g., receiver 412-1 . . . 412-N). The one ore more receivers 412 may include data receiving devices and/or data communication endpoints located at the end of a respective branch of the multicast tree 402.

Each multicast data flow 414 may be identifiable by a state entry for the source tree. The state entry may be based on the notation (S, G) where S represents the IP address of the multicast source 410 (e.g., 10.1.1.1) and G represents the group address (e.g., multicast address) for a group of hosts in a computer network that are available to process datagrams or frames (e.g., 232.1.1.1).

The data flow 414 may be communicated from the multicast source 410 to a first node (e.g., node 406-10). The first node may be a node having a head-node role in the multicast tree 402. For example, the first node may operate as a first-hop router which is directly connected to the multicast source 410 and/or which may be a router on which a traffic engineering (TE) tunnel is configured.

The first node may replicate the multicast packets of the multicast data flow 414 from its incoming interface and send copies of them on its outgoing interfaces. In this instance, the first node may send a copy to a second node (e.g., node 406-1).

The second node may replicate the multicast packets of the multicast data flow 414 from its incoming interface and send copies of them on the outgoing interfaces. In this instance, the second node may be a branching point where the multicast tree 402 branches into two separate branches. For instance, the second node may create a first branch where it forwards a copy of the multicast packets of the multicast flow 414 to a third node (e.g., node 406-2) and a second branch where it forwards a copy of the multicast packets of the multicast data flow 414 to a fifth node (e.g., node 406-5).

The multicast data flow 414 may be propagated node-by-node/hop-by-hop down the first branch to the fourth node (e.g., node 406-3), and then to the fifth node (e.g., node 406-11). The fifth node may be a node having a tail-node role in the multicast tree 402. For example, the fifth node may operate as a last-hop router, may be directly connected to a receiver (e.g., receiver 412-1) and/or may be a router on which a branch of the TE tunnel terminates.

In addition, the multicast flow 414 may be propagated down the second branch to the sixth node (e.g., node 406-6) and then to a seventh node (e.g., node 406-12). The seventh node may also be a node having a tail-node role in the multicast tree 402. For example, the seventh node may operate as a last-hop router, may be directly connected to a receiver (e.g., receiver 412-2) and/or may be a router on which a branch of the TE tunnel terminates.

Additionally, the sixth node, like the second node, may be a branching point where the multicast tree 402 branches off into yet another branch. For instance, the sixth node may create a third branch where it forwards a copy of the multicast packets of the multicast data flow 414 to an eight node (e.g., node 406-N). The eighth node may also be a node having a tail-node role in the multicast tree 402. For example, the eighth node may operate as a last-hop router, may be directly connected to a receiver (e.g., receiver 412-N) and/or may be a router on which a branch of the TE tunnel terminates.

The intervening nodes (e.g., node 406-1, node 406-2, and node 406-3, node 406-5, node 406-6) of the various branches of multicast tree 402 may be nodes having a mid-node role in the multicast tree 402. For example, these nodes may operate as an intermediate-hop router, may not be directly connected to a receiver or the multicast source, may be a node where a multicast data flow 414 comes from an upstream node and is replicated to downstream nodes, and/or may be a router through which a branch of the TE tunnel passes.

The limited multicast route tracing mechanism may be implemented to provide limited route tracing of the topology of multicast tree 402. For instance, user 416 may submit a probe request 418 to a limited multicast route tracing client 420. The multicast route tracing client 420 may be an Mtrace2 client that initiates a limited multicast trace according to the Mtrace2 RFC 8487 protocol.

The probe request 418 may specify a receiver and/or its corresponding last hop router from which the user 416 wants to trace the multicast data flow 414. For instance, the probe request 418 may direct limited multicast route tracing client 420 to initiate a multicast path tracing trace flow from the fifth node (e.g., node 406-11).

Again, limited multicast route tracing client 420 operates as an Mtrace2 client implementing a multicast traceroute facility, which allows the tracing of an IP multicast routing path initiated from an Mtrace2 client by sending a multicast path trace query 422 (e.g., an Mtrace2 Query) to a tail-node (e.g., node 406-11). The multicast path trace query 422 may specify the state entry, in terms of (S, G), for the multicast data flow 414 to be traced.

The tail-node may receive the multicast path trace query 422 and initiate the multicast path tracing therefrom. The multicast path tracing may be directed only upstream from the tail-node and towards the multicast source 410 specified in the source-specific state existing on the receiving node and/or its towards the corresponding head-node (e.g., node 406-10).

The tail-node (e.g., node 406-11) may initiate the multicast path tracing by first turning the multicast path trace query 422 packet into a request message. The request message type may enable each of the nodes 406 upstream of the tail-node to process a copy of the reply message to apply different packet and message validation rules than those required for the handling of the multicast path trace query 422 message. The last-hop router then appends a Standard Response Block (SRB) containing its interface addresses and packet statistics to the request packet, then forwards the request/SRB packet 424 towards the multicast source 410 and/or head-node for the multicast data flow 414. The request/SRB packet 424 may be unicasted to upstream routers towards the multicast source 410 and/or towards the head-node.

In a similar fashion, each node 406 along the first branch up to the multicast source 410 appends its SRB information to the end of the received request packet before forwarding it to its upstream router. When the head-node (e.g., node 406-10) receives the request/SRB packet 424 from its downstream neighboring node, it appends its own SRB to it and turns the request packet into a reply/SRB packet 426. The head-node may unicast the reply/SRB packet 426 back to the route tracing client 420. The reply/SRB packet 426 may specify the topology of one branch of the multicast tree 402 via its component SRB information collected along the trace from each of the nodes.

The traces may also be used to identify and/or diagnose various problems across that particular branch. Unfortunately, current multicast route tracing mechanisms, such as illustrated in FIG. 4, have limited applicability and usefulness to meeting these ends. For example, the current multicast route tracing mechanisms are only able to trace the multicast tree starting from a tail-node and proceeding upstream only to the multicast source 410 and/or head-node as illustrated in FIG. 4.

As noted above, the current multicast route tracing facilities do not provide an efficient and/or deterministic mechanism to identify the topology of a multicast distribution tree in a node-agnostic manner. Instead, current techniques for multicast tree path tracing are directionally limited (e.g., upstream tracing only) and/or limited to receiver-to-source tracing. As a result, the current multicast tree path tracing techniques are not globally applicable across the multicast tree and, therefore, are unable to provide visualization of the entire multicast tree from any part of the network.

For example, current techniques for multicast tree tracing are limited to being initiated at a tail-node and, consequently, are not able to be conducted from a mid-node (e.g., node 406-5) of a multicast tree 402. Even if they were launched from a mid-node, the unidirectional upstream-only approach provided by these techniques would only provide a partial trace of a portion of a single branch of the multicast tree extending upstream from that mid-node to the multicast source. Operationally, network administrators would benefit from visualizing the whole multicast tree from any part of the network. This would provide network administrators with the flexibility and precision to identify topologies and network problems at any point in a multicast tree.

—Multicast Path Traces—

The techniques herein, therefore, introduce mechanisms that provide network administrators with the ability to trace a multicast tree from any part of the network without the need to two protocols in two different directions. In some cases, these mechanisms may be used as extensions to already-implemented protocols such as the Mtrace2 RFC 8487 protocol.

Illustratively, the techniques described herein may be performed by hardware, software, and/or firmware, such as in accordance with path tracing process 248, which may include computer executable instructions executed by the processor 220 (or independent processor of interfaces 210) to perform functions relating to the techniques described herein.

Specifically, according to one or more embodiments described herein, a device may receive a multicast path trace request for a multicast tree, wherein the device is a mid-node in the multicast tree. The device may perform, based on the device being a mid-node in the multicast tree, an upstream trace of network topology of the multicast tree from the device to a head-node of the multicast tree and a downstream trace of network topology of the multicast tree from the device to at least one tail-node. The device may generate an end-to-end visible topology of the multicast tree based on the upstream trace and the downstream trace. The device may provide the end-to-end visible topology of the multicast tree to an observability manager.

Figure 5:
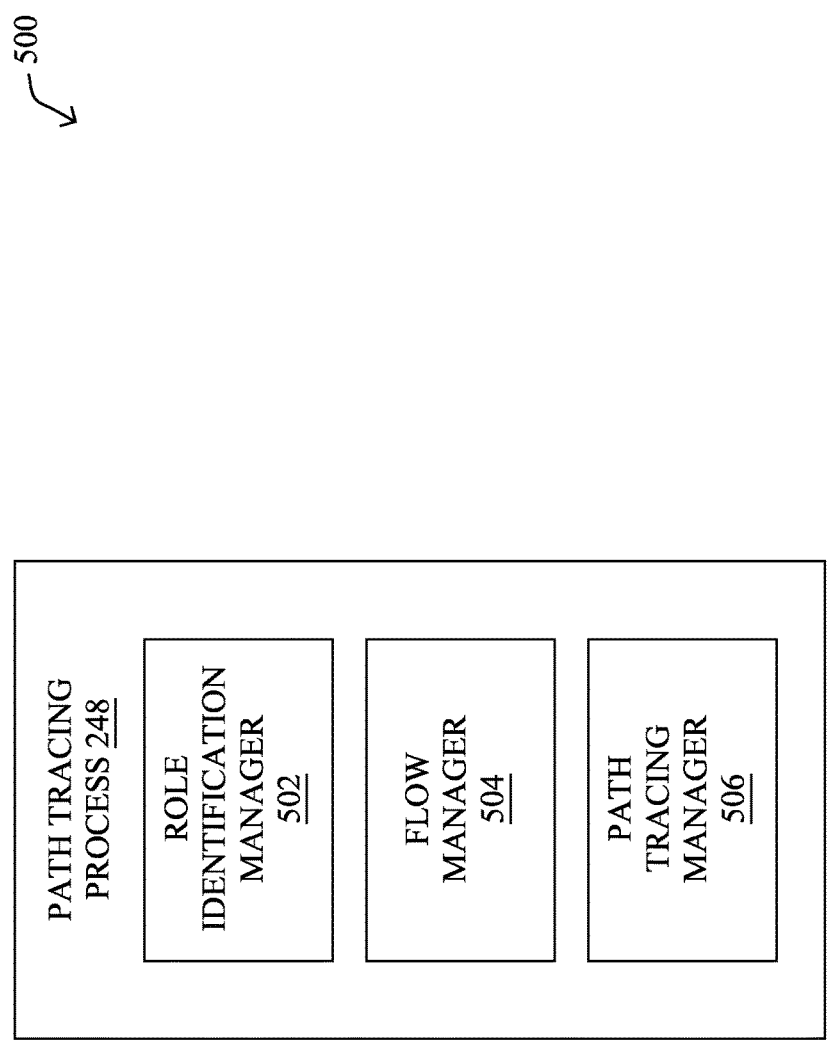
FIG. 5 illustrates an example of an architecture for multicast path tracing.

Operationally, FIG. 5 illustrates an example of an architecture 500 for multicast path tracing, according to various embodiments. At the core of the architecture is path tracing process 248, which may be executed by a device that functions as a communication node and/or a controller in a data communication network. In some examples, the device may be a communication node and/or a controller for a providing video conferencing service or other multicast data flow transmission over a network, or another device in communication therewith. In general, the path tracing process 248 may be executed to trace paths in a multicast tree. This path tracing may be used to discover the end-to-end topology of the multicast tree and/or diagnose and troubleshoot problems occurring in the multicast tree.

As shown, path tracing process 248 may include role identification manager 502, flow manager 504, and/or path tracing manager 506. As would be appreciated, the functionalities of these components may be combined or omitted, as desired. In addition, these components may be implemented on a singular device or in a distributed manner, in which case the combination of executing device can be viewed as their own singular device for purposes of executing path tracing process 248.

During execution, role identification manager 502 may identify a role of a device in a multicast communication network. The device may be a communication node such as a router within a multicast tree. The device may be any node in the multicast tree. For example, the device may have any type of role such as that of a head-node, a mid-node, and/or a tail-node in the multicast tree.

In some examples, role identification manager 502 may perform role identification in response to receiving a multicast path tracing request at the device. The multicast path tracing request may be received at the device from an external client of the device, a local administrator of the device, and/or as an autonomous input in response to a triggering event detected by the device. In some examples, the multicast path tracing request may be provisioned to the device by a network controller of the communication nodes for the multicast tree. It should be appreciated that, since the device may be any node with any type of role in the multicast tree, the multicast path tracing request may be first received by any node with any role in the multicast tree including at mid-node devices.

The role identification manager 502 may identify that the device has a head-node role in the multicast tree based on the device being configured as a first hop router where a multicast source is communicatively connected. The role identification manager 502 may identify that the device has a tail-node role in the multicast tree based on the device being configured as a last hop router where a multicast receiver is communicatively connected. The role identification manager 502 may identify that the device has a mid-node role in the multicast tree based on the device being configured as an intermediate node where a multicast data stream is received form an upstream node and where the multicast data stream is replicated to downstream nodes.

During execution, flow manager 504 may determine whether a data flow exists at a device for the multicast tree. Flow manager 504 may make this determination based on a multicast forwarding state existing for the data flow at the device. For example, if an (S, G) state is cached for a data flow at the device, then it may be determined that the data flow exists at that device for the multicast tree. Conversely, if the state does not exist for the data flow at the device, then flow manager 504 may determine that the data flow is not present locally at the device and that no return tree exists involving that device.

During execution, path tracing manager 506 may manage multicast path tracing for a multicast data flow in the multicast tree. The path tracing may be conducted by propagating multicast path tracing request messages to neighboring nodes in the multicast tree. Each of the nodes receiving and/or propagating the multicast path tracing request messages may append an SRB containing its interface addresses and packet statistics or other metadata to the multicast path tracing request messages. Then, that node forwards the multicast path tracing request/SRB packet to its neighboring nodes.

The particular manner by which the multicast path tracing requests are propagated at a node may be selected by path tracing manager 506 based on the role identified for that node. For example, if role identification manager 502 identified that the node's role in the multicast network is that of a tail-node, then path tracing manager 506 may cause the multicast path tracing request/SRB packet to be propagated only to upstream nodes in a node-by-node/hop-by-hop upstream-oriented tracing from the tail-node to the head-node and/or multicast source. In some instances, this upstream tracing mechanism may mimic the mechanism of the Mtrace2 RFC 8487 protocol and/or the mechanism illustrated in FIG. 4 with respect to the trace initiated at that tail-node.

Alternatively, if role identification manager 502 identifies that the node's role in the multicast network is that of a head-node, then path tracing manager 506 may cause the multicast path tracing request/SRB packet to be propagated only to downstream nodes in a node-by-node/hop-by-hop downstream-oriented tracing from the head-node to the tail-node and/or receiver. That is, in contrast to the previously mentioned upstream-only path tracing, this downstream tracing mechanism may propagate copies of the request/SRB packet to all downstream nodes and/or branches in the multicast tree.

In various embodiments, if role identification manager 502 identifies that the node's role in the multicast network is that of a mid-node, then path tracing manager 506 may initiate a bi-directional multicast path trace from that mid-node. For example, path tracing manager 506 may cause the multicast path tracing request/SRB packet to be propagated both upstream and downstream to the mid-node. This may involve initiating propagation of the multicast path tracing request/SRB packet to downstream nodes in a node-by-node/hop-by-hop downstream-oriented tracing from the mid-node to the tail-node and/or receiver (e.g., this portion of the trace may mimic the Mtrace2 RFC 8487 protocol) to upstream nodes in a node-by-node/hop-by-hop upstream-oriented tracing from the mid-node to the head-node and/or multicast source.

In these bi-directional multicast path trace instances, the path tracing manager 506 may generate an end-to-end visible (e.g., from the perspective of a bi-directional trace initiated at the mid-node) topology of the multicast tree based on the upstream trace and the downstream trace. For example, the path tracing manager 506 may stich the topology revealed by the upstream trace and the topology revealed by the downstream trace from the mid-node together to generate the end-to-end visible topology of the multicast tree.

Path tracing manager 506 may then provide the end-to-end visible topology of the multicast tree to an observability manager. This topology may be supplemented with and/or include observability data (e.g., path metrics, telemetry data, logs, metrics, traces, metadata, etc.) that was included with the SRB added by each propagating node). The end-to-end visible topology of the multicast tree and/or the observability data may be used be an observability manager for topology discovery, network monitoring, network problem identification, and/or troubleshooting purposes. For example, path tracing manager 506 may provide the end-to-end visible topology of the multicast tree and/or its associated observability to controller 320 and/or visualization system 350 of illustrated in FIG. 3 to perform observability operations.

In various embodiments, the path tracing actions of the path tracing manager 506 may be premised on the flow existing at the node whence the trace is to be instigated. For instance, only if flow manager 504 determines that the (S, G) state exists at the node and/or that the data flow is present locally at that node will path tracing manager 506 instigate the role-dependent trace. Conversely, if flow manager 504 determines that the (S, G) state does not exist at the node and/or that the multicast data flow is not present locally at that node/no return tree exists, then the path tracing manager 506 will not initiate a path trace therefrom.

Figure 6:
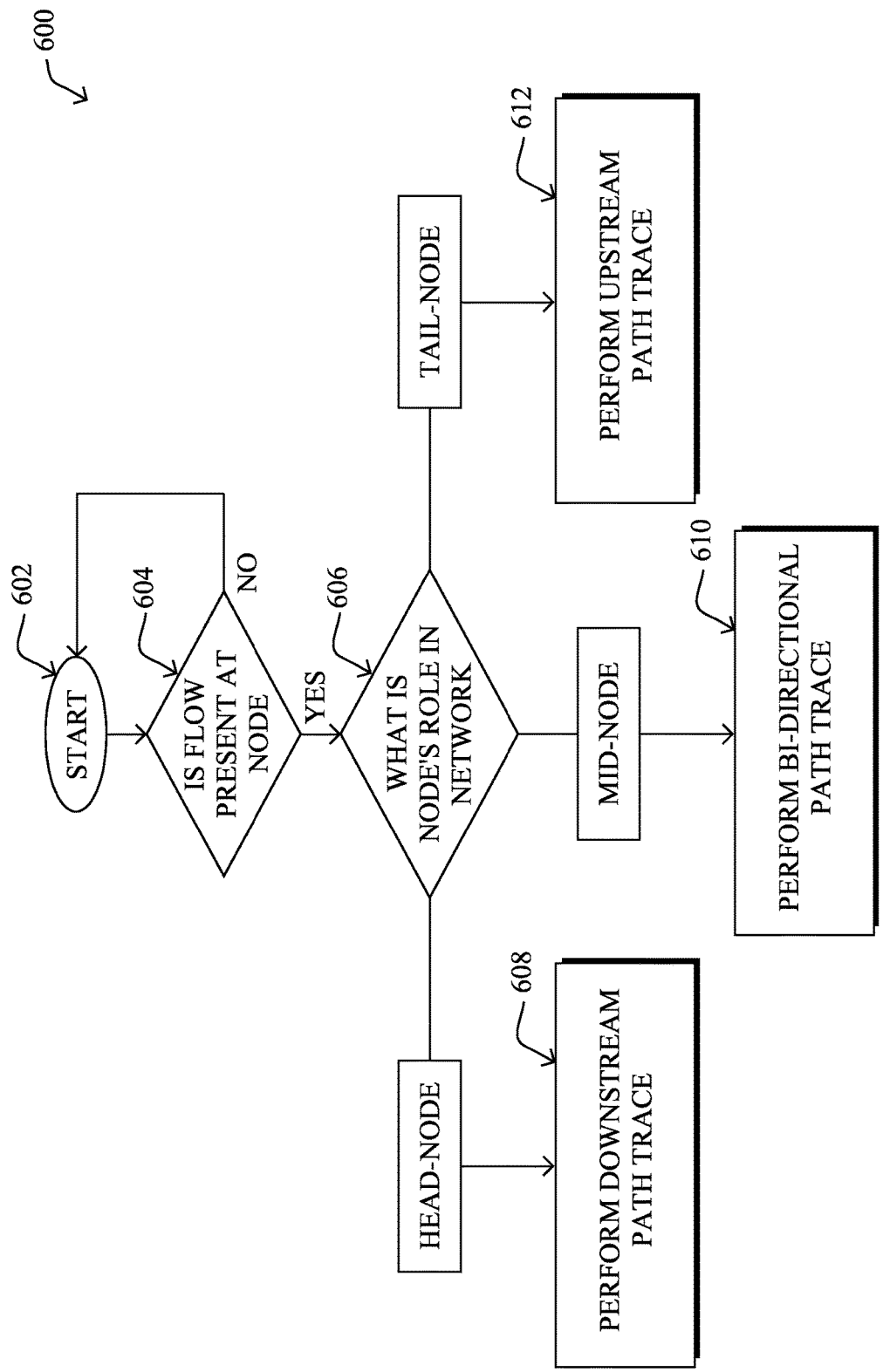
FIG. 6 illustrates an example of a process flow for multicast path tracing.

FIG. 6 illustrates an example of a process flow 600 for multicast path tracing, according to various embodiments. Specifically, flow 600 illustrates an example of steering logic for initiating multicast path traces at any of a variety of multicast tree nodes at any location in the multicast tree.

Flow 600 begins at box 602. In various embodiments, box 602 may correspond to receiving a multicast path tracing query for a multicast data flow at a node of a multicast tree. Upon receiving the query, flow 600 may proceed to box 604.

At box 604, it may be determined whether a multicast data flow for the multicast tree is present at the node. This determination may be based on whether an (S, G) state exists for the data flow at the node. If, at box 604, it is determined that no data flow exists at the device, then flow 600 may return to box 602 to await receipt of an additional query. Alternatively, if, at box 604, it is determined that the data flow does exist at the device, then flow 600 may proceed to box 606.

At box 606, it may be determined what the node's role is in the network. For example, it may be determined whether the node has a head-node role, a mid-node role, or a tail-node role.

If, at box 606, it is determined that the node has a head-node role, then the flow 600 may proceed to box 608. At box 608, a downstream multicast path trace originating at the head-node may be performed.

If, at box 606, it is determined that the node has a mid-node role, then the flow 600 may proceed to box 610. At box 610, a bi-directional multicast path trace originating at the mid-node may be performed.

If, at box 606, it is determined that the node has a tail-node role, then the flow 600 may proceed to box 612. At box 612, an upstream multicast path trace originating at the tail-node may be performed.

Figure 7A:
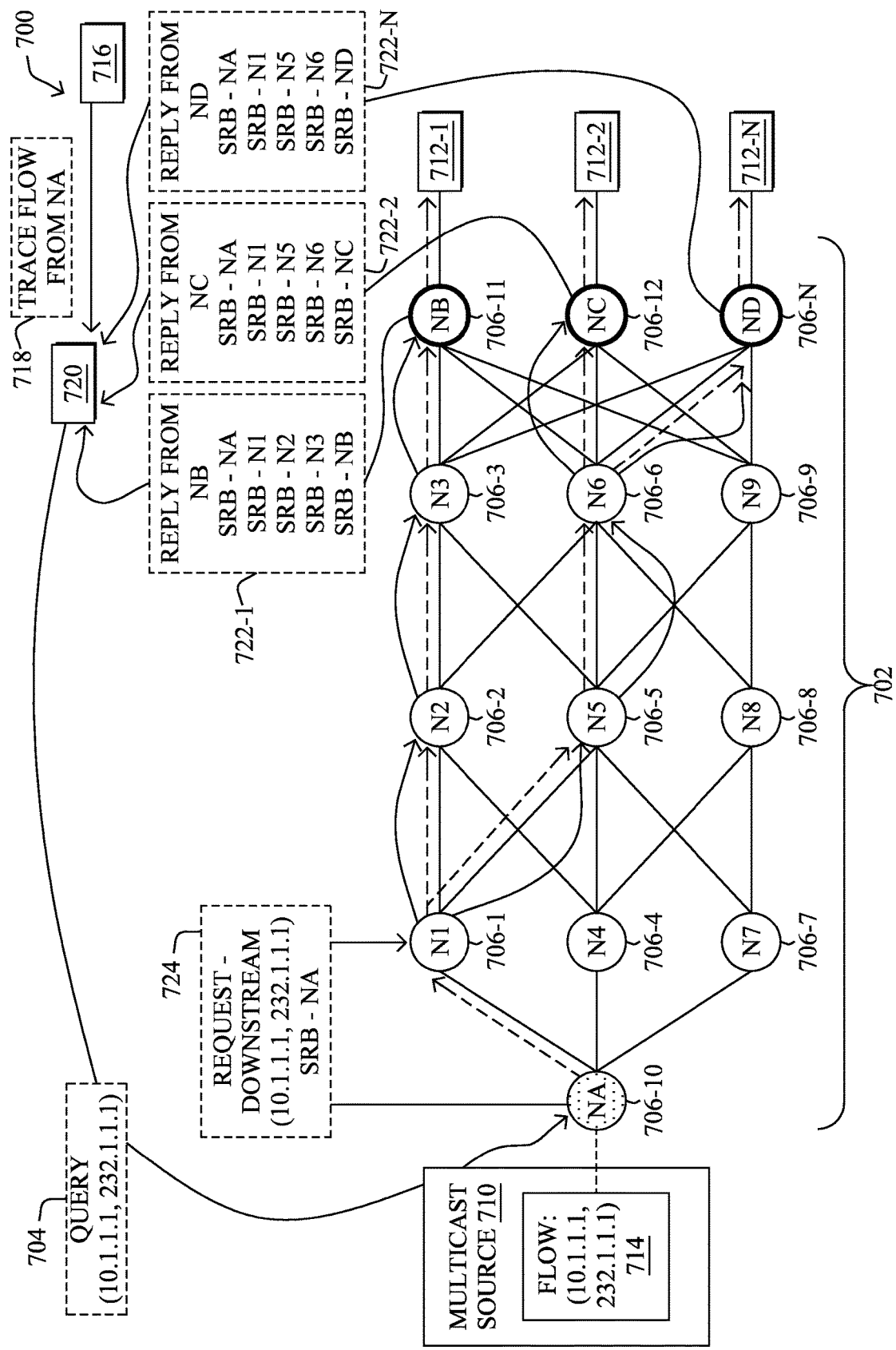
FIGS. 7A-7B illustrate examples of a deployment of an architecture for multicast path tracing.
Figure 7B:
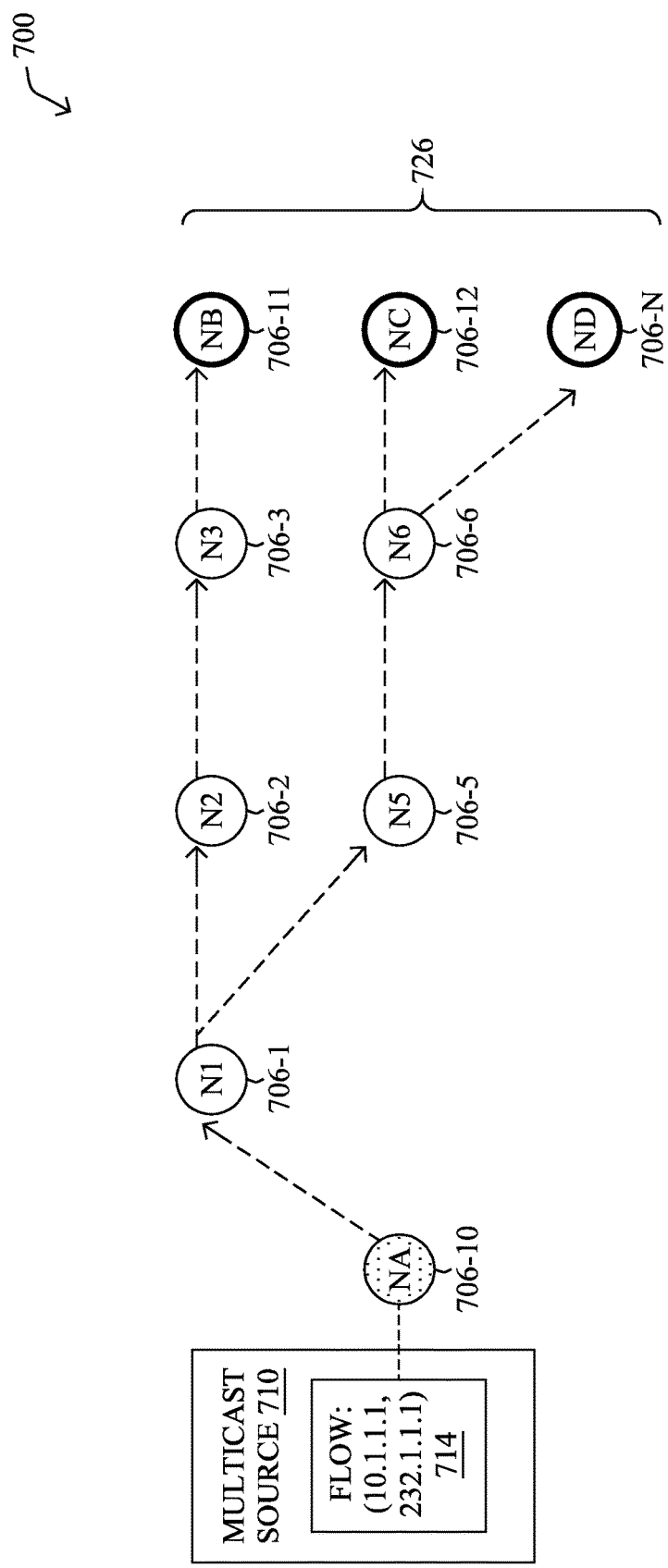

FIGS. 7A-7B illustrate examples of a deployment 700 of an architecture (e.g., architecture 500 in FIG. 5) for multicast path tracing, according to various embodiments. Specifically, deployment 700 illustrates an example of downstream multicast path trace initiated at a head-node. It is noted that, since the upstream multicast path trace initiated at a tail-node would proceed according to a similar process (e.g., utilizing the Mtrace2 RFC 8487 protocol) to that illustrated in FIG. 4, it is not illustrated separately.

Deployment 700 is shown operating on a multicast tree 702 including a plurality of multicast network communication nodes 706 (e.g., nodes 706-1 . . . 706-N). The nodes 706 may be communicatively interconnected via a web of communication channels 708. The nodes 706 and/or communication channels 708 may be utilized to communicate multicast data flows (e.g., data flow 714) across various branches of the multicast tree 702. For example, a data flow 714 may be communicated from a multicast source 710 to multicast receivers 712 (e.g., multicast receivers 712-1 . . . 712-N) by propagation across one or more branches of multicast tree 702.

In various embodiments, a user 716 may submit a probe request 718 to a multicast route tracing client 720. Unlike the limited multicast route tracing client of FIG. 4, multicast route tracing client 720 may include the additional functionality of being able to process probe requests direct to and/or initiate corresponding multicast path tracing operations from not only tail-nodes, but also head-nodes and/or any mid-nodes of a multicast tree.

The probe request 718 may be a request to trace a portion of a multicast tree associated with delivering data flow 714 from the multicast source 710 to one or more receivers 712. The probe request 718 may specify an address of a multicast source 710 of a data flow 714 and/or its corresponding head-node from which a multicast path tracing of the multicast tree 702 should proceed for the data flow 714. For instance, the probe request 718 may direct multicast route tracing client 720 to trace data flow 714 from a first-hop node or head-node (e.g., node 706-10) coupled to multicast source 710.

Multicast route tracing client 720 may, responsive to receiving probe request 718, issue a multicast path tracing query 704 to the head-node specified in the probe request 718. The multicast path tracing query 704 may specify the multicast source 710 address (S) and the multicast group address (G), in terms of (S, G), for the multicast data flow 714 to be traced.

Upon receiving the multicast path tracing query 704, the head-node may identify its role for the multicast data flow 714 identified in the query as a head-node (e.g., based on its local connection to multicast source 710). The head-node may then convert multicast path tracing query 704 packet into a downstream-type multicast path tracing request message. The downstream-type multicast path tracing request message type may enable each of the downstream nodes 706 receiving and/or processing the message to apply different packet and message validation rules than those required for the handling of a query message. The head-node may append an SRB containing its interface addresses, packet statistics, observability date, and/or other metadata to the request packet.

Then, the head-node may forward the downstream-type multicast path tracing request/SRB packet 724 for (10.1.1.1, 232.1.1.1) downstream to a next node(s) (e.g., node 706-1) in the direction of one or more tail-nodes (e.g., node 706-11, node 706-12, node 706-N). The downstream-type multicast path tracing request/SRB packet 724 may identify each outgoing port for this flow.

When the next node (e.g., node 706-1) receives the downstream-type multicast path tracing request/SRB packet 724 from the head-node, it may replicate the downstream-type multicast path tracing request/SRB packet 724 appending its own SRB and/or observability data thereto and forward that replicated downstream-type multicast path tracing request/SRB packet 724 downstream to a next node(s) (e.g., node 706-2 and node 706-5) of the data flow 714 in the direction of one or more tail-nodes (e.g., node 706-11, node 706-12, node 706-N) of the data flow 714. Each downstream receiving node may repeat this process (e.g., replicating the request and adding its own SRB and/or observability data) until the requests are received by the one or more tail-nodes (e.g., node 706-11, node 706-12, node 706-N).

Upon receiving the downstream-type multicast path tracing request/SRB packet 724 from a preceding node, each of the receiving one or more tail-nodes (e.g., node 706-11, node 706-12, node 706-N) may append their SRB and observability data and convert the downstream-type multicast path tracing request/SRB packet 724 to a respective reply/SRB packet 722 (e.g., reply/SRB packet 722-1, reply/SRB packet 722-2, reply/SRB packet 722-N).

For example, a first tail-node (e.g., node 706-11) may generate a first reply/SRB packet 722-1 upon receiving the downstream-type multicast path tracing request/SRB packet 724 from a preceding mid-node (e.g., node 706-3). A second tail-node (e.g., node 706-12) may generate a second reply/SRB packet 722-2 upon receiving the downstream-type multicast path tracing request/SRB packet 724 from a preceding mid-node (e.g., node 706-6). A third tail-node (e.g., node 706-N) may generate a third reply/SRB packet 722-N upon receiving the downstream-type multicast path tracing request/SRB packet 724 from a preceding mid-node (e.g., node 706-6). The reply/SRB packets 722 may be thought of as the results of the path trace initiated at the head-node.

Each of the reply/SRB packets 722 may define a respective portion of the multicast tree 702 for a data flow 714. For example, the SRB data of the first reply/SRB packet 722-1 may reveal that packet originated at node 706-10, was sent to node 706-1, then to node 706-2, then to node 706-3, until finally arriving at node 706-11. The SRB data of the second reply/SRB packet 722-2 may reveal that packet originated at node 706-10, was sent to node 706-1, then to node 706-5, then to node 706-6, until finally arriving at node 706-12. The SRB data of the third reply/SRB packet 722-N may reveal that packet originated at node 706-10, was sent to node 706-1, then to node 706-5, then to node 706-6, until finally arriving at node 706-N. In some instances, each of the tail-nodes (e.g., node 706-11, node 706-12, node 706-N) may send their respective reply/SRB packet 722 back to multicast route tracing client 720.

An end-to-end visible topology 726 of the multicast tree 702 may be generated based on the topologies defined by the reply/SRB packets 722 from each of the tail-nodes. A visible topology, in this instance, may include the topology visible and/or discoverable from the perspective of a downstream trace initiated at the head-node.

For example, the SRB data and/or the topology definitions inferred therefrom of first reply/SRB packet 722-1, second reply/SRB packet 722-2, and/or third reply/SRB packet 722-N may be stitched together to generate the end-to-end visible topology 726. The end-to-end visible topology 726 and/or any accompanying observability data may be provided to an observability manager and/or be provided to a user for topology discovery, network monitoring, network problem identification, troubleshooting purposes, etc.

Figure 8A:
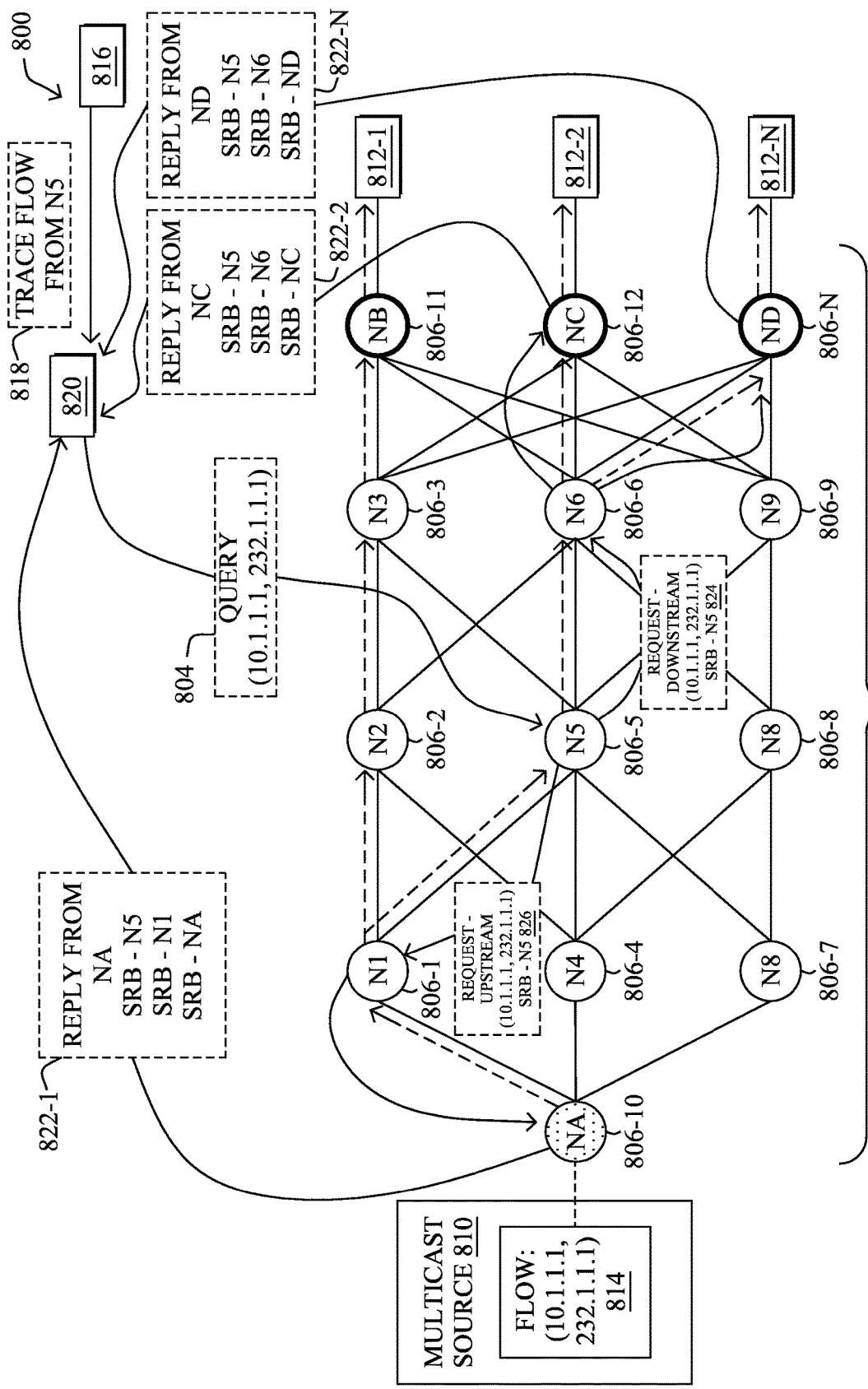
FIGS. 8A-8B illustrate examples of a deployment of an architecture for multicast path tracing.
Figure 8B:
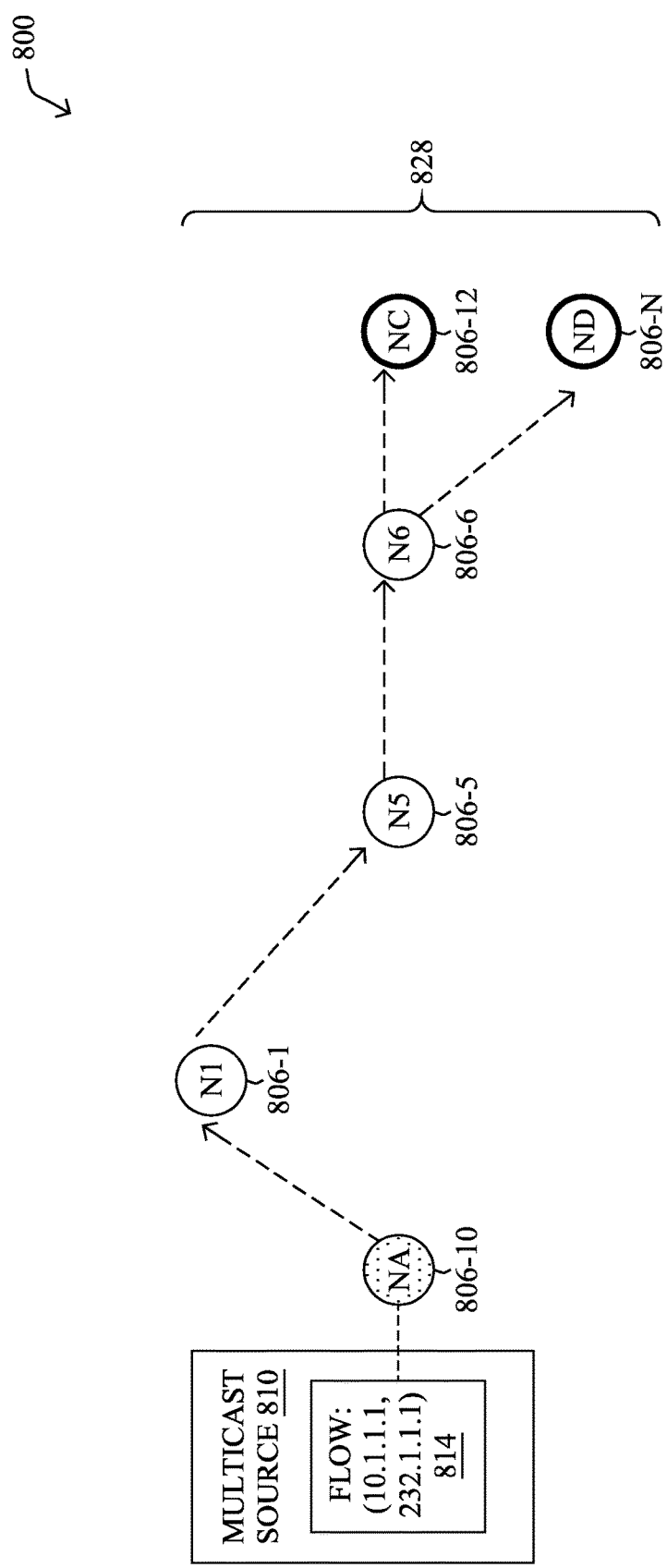

FIGS. 8A-8B illustrate examples of a deployment 800 of an architecture (e.g., architecture 500 in FIG. 5) for multicast path tracing, according to various embodiments. Specifically, deployment 800 illustrates an example of downstream multicast path trace initiated at a mid-node.

Deployment 800 is shown operating on a multicast tree 802 including a plurality of multicast network communication nodes 806 (e.g., nodes 806-1 . . . 806-N). The multicast network communication nodes 806 may be communicatively interconnected via a web of communication channels 808. The multicast network communication nodes 806 and/or communication channels 808 may be utilized to communicate data flows (e.g., data flow 814) across various branches of the multicast tree 802. For example, a data flow 814 may be communicated from a multicast source 810 to one or more multicast receivers 812 (e.g., multicast receivers 812-1 . . . 812-N) by propagation across one or more branches of multicast tree 802.

In various embodiments, a user 816 may submit a multicast route tracing probe request 818 to a multicast route tracing client 820. The multicast route tracing probe request 818 may be a request to trace a portion of a multicast tree associated with delivering data flow 814 from the multicast source 810 to one or more multicast receivers 812. The multicast route tracing probe request 818 may specify a mid-node router from which to trace the data flow 814. For instance, the multicast route tracing probe request 818 may direct multicast route tracing client 820 to trace data flow 814 from the mid-node (e.g., node 806-5).

Multicast route tracing client 820 may respond to multicast route tracing probe request 818 by issuing a multicast route tracing query 804 to the mid-node specified in the probe request 818. The multicast route tracing query 804 may specify the multicast source 810 address (S) and the multicast group address (G), in terms of (S, G), for the data flow 814 to be traced.

Upon receiving the multicast route tracing query 804, the mid-node may identify its role for the data flow 814 identified in the multicast route tracing query (e.g., 10.1.1.1, 232.1.1.1). For example, the mid-node may identify and/or confirm it role as a mid-node (e.g., based on the multicast source 810 not being locally connected and/or the node operating as an intermediate where multicast streams are received from upstream nodes and replicated to downstream nodes). The mid-node may, responsive to receiving the multicast route tracing query 804, initiate bi-directional multicast path tracing operations originating from itself.

For example, the mid-node may then convert multicast route tracing query 804 packet into both a downstream-type multicast path tracing request message and an upstream-type multicast path tracing request message to effectuate the bi-directional path tracing. The downstream-type multicast path tracing request message may enable each of the nodes that are downstream from the mid-node for the data flow 814 (e.g., node 806-6, node 806-12, and node 406-N) to receive and/or process the message to apply different packet and message validation rules than those required for the handling of a query message.

The mid-node may append an SRB containing its interface addresses, packet statistics, observability data, and/or other metadata to the request packet. Then, the mid-node may forward the downstream-type multicast path tracing request/SRB packet 824 for (10.1.1.1, 232.1.1.1) downstream to a next node(s) (e.g., node 806-6) in the direction of one or more tail-nodes (e.g., node 806-11, node 806-12, node 806-N). The downstream-type multicast path tracing request/SRB packet 824 may identify each outgoing port for this flow.

When the next node (e.g., node 806-6) receives the downstream-type multicast path tracing request/SRB packet 824 from the mid-node, it may replicate the downstream-type multicast path tracing request/SRB packet 824 appending its own SRB and/or observability data thereto and forward that replicated downstream-type multicast path tracing request request/SRB packet 824 further downstream to a next node(s) that may repeat this process (e.g., replicating the request and adding its own SRB and related observability data) until the requests are received by the one or more tail-nodes (e.g., node 806-12 and node 806-13).

Upon receiving the downstream-type multicast path tracing request request/SRB packet 824 from a preceding node, each of the receiving one or more tail-nodes (e.g., node 806-12 and node 806-13) may append their SRB information and related observability data and convert the downstream-type multicast path tracing request request/SRB packet 824 to a respective reply/SRB packet 822 (reply/SRB packet 822-2 and reply/SRB packet 822-N).

For example, a first tail-node (e.g., node 806-12) may generate a first reply/SRB packet 822-2 upon receiving the downstream-type multicast path tracing request request/SRB packet 824 from a preceding mid-node (e.g., node 806-6). A second tail-node (e.g., node 806-N) may generate a second reply/SRB packet 822-N upon receiving the downstream-type multicast path tracing request request/SRB packet 824 from a preceding mid-node (e.g., node 806-6). The first reply/SRB packet 822-2 and second reply/SRB packet 822 may be thought of as the results of the downstream portion of the path trace initiated at the mid-node. In some examples, the first reply/SRB packet 822-2 and second reply/SRB packet 822 may be sent back to the multicast route tracing client 820 from their respective tail-nodes (e.g., node 806-12 and node 806-N).

Conversely, the upstream-type multicast path tracing request message generated at the mid-node (e.g., node 806-5) may enable each of the nodes that are upstream from the mid-node for the data flow 814, (e.g., node 806-1 and node 806-10) to receive and/or process the message to apply different packet and message validation rules than those required for the handling of a query message. The mid-node may then append an SRB containing its interface addresses, packet statistics, observability date, and/or other metadata to the request packet. Then, the mid-node may forward the upstream-type multicast path tracing request/SRB packet 826 for (10.1.1.1, 232.1.1.1) upstream to a next node(s) (e.g., node 806-1) in the direction of a head-node (e.g., node 806-10). The upstream-type multicast path tracing request/SRB packet 826 may be propagated per the Mtrace2 RFC 8487 protocol as though the mid-node was a tail-node.

For example, when the next node (e.g., node 806-1) receives the upstream-type multicast path tracing request/SRB packet 826 from the mid-node, it may replicate the upstream-type multicast path tracing request/SRB packet 826 appending its own SRB and corresponding observability data thereto and forward that replicated upstream-type multicast path tracing request request/SRB packet 826 further upstream to a next node(s) that may repeat this process (e.g., replicating the request and adding its own SRB and related data) until the requests are received by the head-node (e.g., node 806-10).

Upon receiving the upstream-type r multicast path tracing request/SRB packet 826 from a preceding node, the head-node (e.g., node 806-10) may append its SRB information and related data and convert the upstream-type multicast path tracing request/SRB packet 826 to a reply/SRB packet 822 (reply/SRB packet 822-1). The reply/SRB packet 822-1 may be thought of as the results of the upstream portion of the path trace initiated at the mid-node. In some examples, the reply/SRB packet 822-1 may be sent back to the multicast route tracing client 820 from the head-node (e.g., node 806-10).

An end-to-end visible topology 828 of the multicast tree 802 may be generated based on the topologies defined by the reply/SRB packets 822 from the head-node (e.g., node 806-10) and each of the tail-nodes (e.g., node 806-12 and node 806-N). A visible topology, in this instance, may include the topology visible and/or discoverable from the perspective of a downstream trace and an upstream trace initiated at the mid-node.

For example, the SRB data and/or topology definitions inferred therefrom of reply/SRB packet 822-1, reply/SRB packet 822-2, and/or reply/SRB packet 822-N may be stitched together to generate the end-to-end visible topology 828. The end-to-end visible topology 828 and/or any accompanying observability data may be provided to an observability manager and/or be provided to a user for topology discovery, network monitoring, network problem identification, troubleshooting purposes, etc.

FIG. 9 illustrates an example of a packet format 900 for encoding multicast path tracing messages, according to various embodiments. Specifically, packet format 900 illustrates an example of a type/length/value (TLV) format for encoding multicast path tracing messages. In some examples, this packet format 900 may be an extension to the format defined in the Mtrace2 RFC 8487 protocol.

The packet format 900 may include a type designating field 902. The type may be 8 bits. The type may describe the format of the value field. Some examples of traditional type definitions may include: 0x00—Reserved, 0x01—Mtrace2 Query, 0x02—Mtrace2 Request, 0x03—Mtrace2 Reply, 0x04—Mtrace2 Standard Response Block, 0x05—Mtrace2 Augmented Response Block, and/or 0x06—Mtrace2 Extended Query Block. In various embodiments, additional and/or alternative type definitions may be included.

For example, an upstream Mtrace query type may be used. The upstream Mtrace query type may include a query that is started from a downstream router (e.g., downstream from an actual source and/or essentially closer to a receiver). The upstream Mtrace query type may follow the reverse path of the multicast traffic of the data flow.

In another example, a downstream Mtrace query may be used. The downstream Mtrace query type may include a query that proceeds toward the receivers. The downstream Mtrace query type may include a query that follows the outgoing port information for a given (S, G). The downstream Mtrace query type may follow the path of the multicast traffic of the data flow from its starting point.

Figure 10:
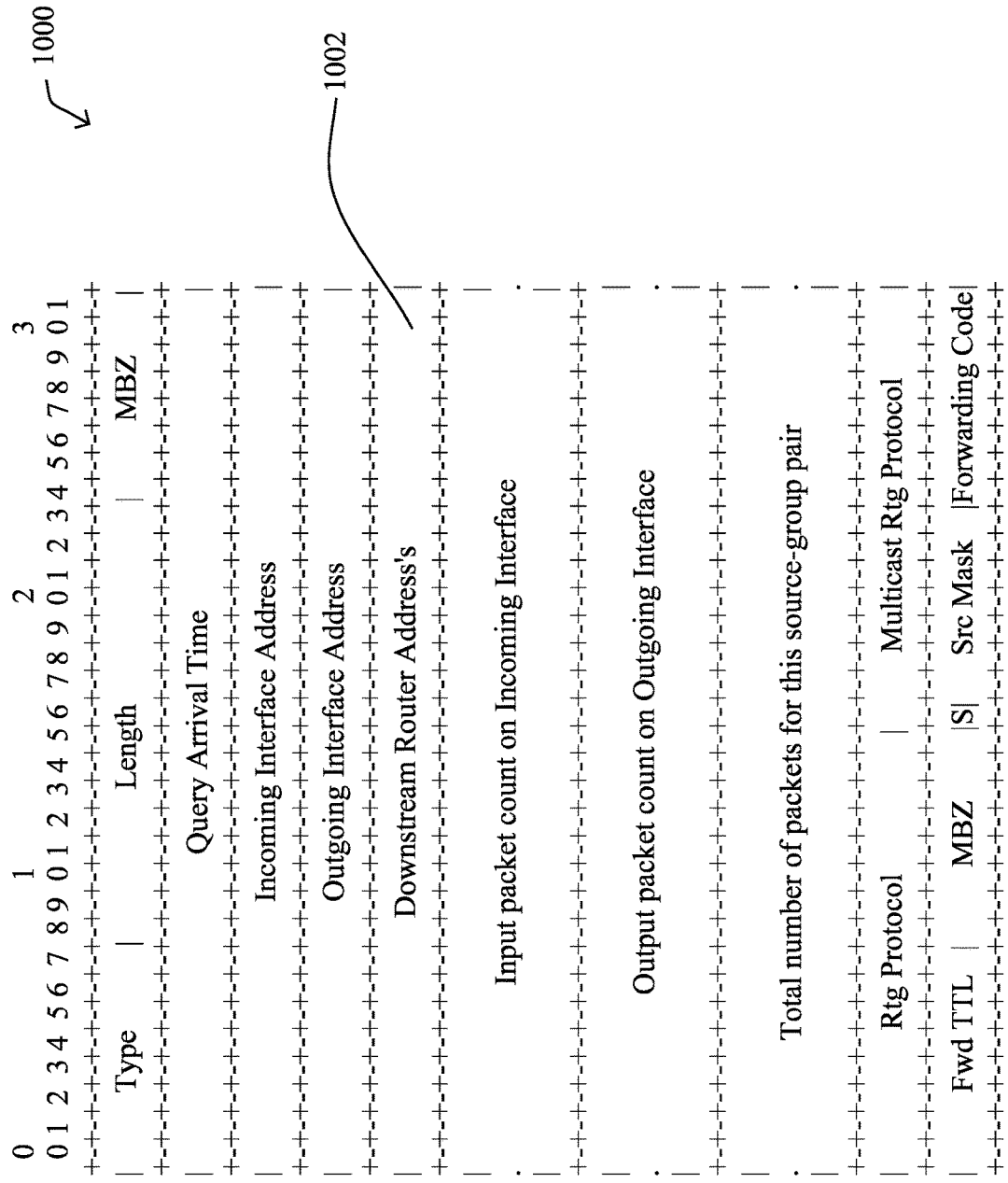
FIG. 10 illustrates an example of a message format for a standard response block for multicast path tracing messages.

FIG. 10 illustrates an example of a message format 1000 for a standard response block (SRB) for multicast path tracing messages, according to various embodiments. Specifically, message format 1000 illustrates a modification to the standard response block format defined in the Mtrace2 RFC 8487 protocol. For example, the message format 1000 may include a downstream router addresses field 1002 and associated information for downstream queries.

Figure 11:
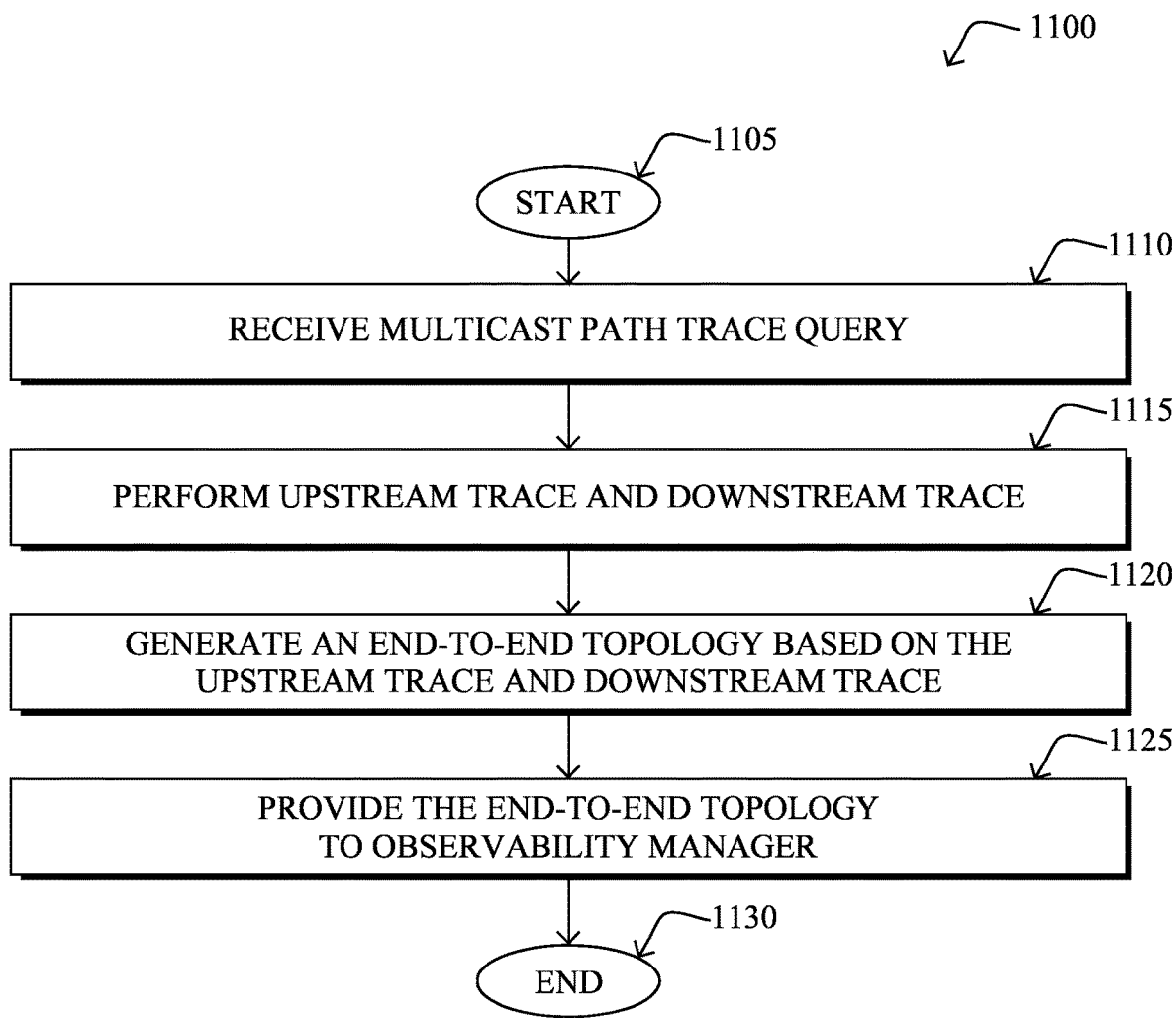
FIG. 11 illustrates an example simplified procedure for multicast path tracing, in accordance with one or more embodiments described herein.

In closing, FIG. 11 illustrates an example simplified procedure for multicast path tracing in accordance with one or more embodiments described herein. For example, a non-generic, specifically configured device (e.g., device 200) may perform procedure 1100 by executing stored instructions (e.g., process 248). The procedure 1100 may start at step 1105, and continues to step 1110, where, as described in greater detail above, a device may receive a multicast path trace query for a multicast tree, wherein the device is a mid-node in the multicast tree. The device may determine that the device is a mid-node in the multicast tree based on the device being configured as an intermediate node where a multicast stream is received form an upstream node and where the multicast stream is replicated to downstream nodes.

The multicast path trace query may be received from an external client of the device. Additionally, or alternatively, the multicast path trace query may be received from a local administrator of the device. In further examples, the multicast path trace query may be received as an autonomous input in response to a triggering event detected by the device.

At step 1115, as detailed above, the device may perform, based on the device being a mid-node in the multicast tree, an upstream trace of network topology of the multicast tree from the device to a head-node of the multicast tree and a downstream trace of network topology of the multicast tree from the device to at least one tail-node. The device may perform the upstream trace and downstream trace after and in response to determining that the device is the mid-node as opposed to being either of a head-node of the multicast tree or a tail-node of the multicast tree.

The device may generate replicant downstream trace requests and send each of the replicant downstream trace requests to a respective downstream node in the multicast tree. In some examples, the device may perform the upstream trace and the downstream trace by performing an upstream traceroute operation and a downstream traceroute operation, respectively.

The device may determine whether a data flow exists at the device for the multicast tree based on a multicast forwarding state existing for the data flow at the device. The device may perform the upstream trace and the downstream trace only in response to a determination that the data flow exists at the device.

At step 1120, as detailed above, the device may generate an end-to-end visible topology of the multicast tree based on the upstream trace and the downstream trace. The device may generate the end-to-end visible topology of the multicast tree by stitching together a first view of network topology of the multicast tree obtained from the upstream trace from the device to the head-node with a second view of network topology of the multicast tree obtained from the downstream trace from the device to the at least one tail-node.

At step 1125, as detailed above, the device may provide the end-to-end visible topology of the multicast tree to an observability manager.

The simplified procedure 1100 may then end in step 1130, notably with the ability to continue performing additional multicast path traces based on multicast path trace queries. Other steps may also be included generally within procedure 1100. For example, such steps (or, more generally, such additions to steps already specifically illustrated above), may include: determining that the node is a head-node in the multicast tree based on the node being configured as a first hop router where a multicast source is communicatively connected and performing, based on the node being the head-node in the multicast tree, a downstream trace of a network topology of the multicast tree from the head-node to the at least one tail-node; determining that the node is a tail-node in the multicast tree based on the node being configured as a last hop router to which a multicast receiver is communicatively connected and performing based on the node being the tail-node, an upstream trace of a network topology of the multicast tree from the tail-node to the head-node; and so on.

It should be noted that while certain steps within procedure 1100 may be optional as described above, the steps shown in FIG. 11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for multicast path tracing. In particular, the techniques herein improve network visibility and troubleshooting by introducing bi-directional multicast path tracing that enables multicast path tracing requests to be propagated both upstream and downstream from a node. Moreover, these multicast path tracing techniques can be implemented based on a node's role in a multicast network (e.g., downstream path tracing from a head-node, upstream path tracing from a tail-node, and both downstream and upstream tracing from a mid-node). This enables users to associate upstream and downstream tracing reply reports to generate an end-to-end visible topology of the multicast tree which may be utilized for topology discovery, network monitoring, network problem identification, troubleshooting purposes, etc.

Illustratively, the techniques described herein may be performed by hardware, software, and/or firmware, such as in accordance with the illustrative path tracing process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: receiving, by a device, a multicast path trace query for a multicast tree, wherein the device is a mid-node in the multicast tree; performing, by the device and based on the device being a mid-node in the multicast tree, an upstream trace of network topology of the multicast tree from the device to a head-node of the multicast tree and a downstream trace of network topology of the multicast tree from the device to at least one tail-node; generating, by the device, an end-to-end visible topology of the multicast tree based on the upstream trace and the downstream trace; and providing, by the device, the end-to-end visible topology of the multicast tree to an observability manager.

In one embodiment, the method may further comprise: determining, by the device, that the device is a mid-node in the multicast tree based on the device being configured as an intermediate node where a multicast stream is received form an upstream node and where the multicast stream is replicated to downstream nodes. In one embodiment, performing the upstream trace and downstream trace may be performed after and in response to determining that the device is the mid-node as opposed to being either of a head-node of the multicast tree or a tail-node of the multicast tree. In one embodiment, performing the downstream trace of network topology of the multicast tree from the device to the at least one tail-node may further comprise: generating replicant downstream trace requests; and sending each of the replicant downstream trace requests to a respective downstream node in the multicast tree. In one embodiment, performing the upstream trace and the downstream trace may comprise: performing an upstream traceroute operation and a downstream traceroute operation, respectively. In one embodiment, the method may further comprise determining whether a data flow exists at the device for the multicast tree based on a multicast forwarding state existing for the data flow at the device; and performing the upstream trace and the downstream trace only in response to a determination that the data flow exists at the device. In one embodiment, generating the end-to-end visible topology of the multicast tree based on the upstream trace and the downstream trace comprises: stitching together a first view of network topology of the multicast tree obtained from the upstream trace from the device to the head-node with a second view of network topology of the multicast tree obtained from the downstream trace from the device to the at least one tail-node. In one embodiment, the multicast path trace query is received from an external client of the device. In one embodiment, the multicast path trace query is received from a local administrator of the device. In one embodiment, the multicast path trace query is received as an autonomous input in response to a triggering event detected by the device. In one embodiment, the multicast path trace query is received from a controller.

According to the embodiments herein, an illustrative tangible, non-transitory, computer-readable medium herein may have computer-executable instructions stored thereon that, when executed by a processor on a computer, may cause the computer to perform a method comprising: receiving a multicast path trace query for a multicast tree at a node in the multicast tree; performing, based on the node being a mid-node in the multicast tree, an upstream trace of network topology of the multicast tree from the mid-node to a head-node of the multicast tree and a downstream trace of network topology of the multicast tree from the mid-node to at least one tail-node; generating an end-to-end visible topology of the multicast tree based on the upstream trace and the downstream trace; and providing the end-to-end visible topology of the multicast tree to an observability manager.

In one embodiment, the method further comprises: determining that the node is a head-node in the multicast tree based on the node being configured as a first hop router where a multicast source is communicatively connected; and performing, based on the node being the head-node in the multicast tree, a downstream trace of a network topology of the multicast tree from the head-node to the at least one tail-node. In one embodiment, the method further comprises determining that the node is a tail-node in the multicast tree based on the node being configured as a last hop router to which a multicast receiver is communicatively connected; and performing, based on the node being the tail-node, an upstream trace of a network topology of the multicast tree from the tail-node to the head-node. In one embodiment, the multicast path trace query is received from one of: an external client of the node; a local administrator of the node; or a controller.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: receive a multicast path trace query for a multicast tree at a device, wherein the device is a mid-node in the multicast tree; perform, based on the device being the mid-node in the multicast tree, an upstream trace of network topology of the multicast tree from the mid-node to a head-node of the multicast tree and a downstream trace of network topology of the multicast tree from the mid-node to at least one tail-node; generate an end-to-end visible topology of the multicast tree based on the upstream trace and the downstream trace; and provide the end-to-end visible topology of the multicast tree to an observability manager.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
receiving, by a device, a multicast path trace query for a multicast tree, wherein the device is a mid-node in the multicast tree;
performing, by the device and based on the device being a mid-node in the multicast tree, an upstream trace of network topology of the multicast tree from the device to a head-node of the multicast tree and a downstream trace of network topology of the multicast tree from the device to at least one tail-node;
generating, by the device, an end-to-end visible topology of the multicast tree based on the upstream trace and the downstream trace; and
providing, by the device, the end-to-end visible topology of the multicast tree to an observability manager.

2. The method as in claim 1, further comprising:
determining, by the device, that the device is a mid-node in the multicast tree based on the device being configured as an intermediate node where a multicast stream is received from an upstream node and where the multicast stream is replicated to downstream nodes.

3. The method as in claim 2, wherein performing the upstream trace and downstream trace is performed after and in response to determining that the device is the mid-node as opposed to being either of a head-node of the multicast tree or a tail-node of the multicast tree.

4. The method as in claim 1, wherein performing the downstream trace of network topology of the multicast tree from the device to the at least one tail-node further comprises:
generating replicant downstream trace requests; and
sending each of the replicant downstream trace requests to a respective downstream node in the multicast tree.

5. The method as in claim 1, wherein performing the upstream trace and the downstream trace comprises:
performing an upstream traceroute operation and a downstream traceroute operation, respectively.

6. The method as in claim 1, further comprising:
determining whether a data flow exists at the device for the multicast tree based on a multicast forwarding state existing for the data flow at the device; and
performing the upstream trace and the downstream trace only in response to a determination that the data flow exists at the device.

7. The method as in claim 1, wherein generating the end-to-end visible topology of the multicast tree based on the upstream trace and the downstream trace comprises:
stitching together a first view of network topology of the multicast tree obtained from the upstream trace from the device to the head-node with a second view of network topology of the multicast tree obtained from the downstream trace from the device to the at least one tail-node.

8. The method as in claim 1, wherein the multicast path trace query is received from an external client of the device.

9. The method as in claim 1, wherein the multicast path trace query is received from a local administrator of the device.

10. The method as in claim 1, wherein the multicast path trace query is received as an autonomous input in response to a triggering event detected by the device.

11. The method as in claim 1, wherein the multicast path trace query is received from a controller.

12. A tangible, non-transitory, computer-readable medium having computer-executable instructions stored thereon that, when executed by a processor on a computer, cause the computer to perform a method comprising:
receiving a multicast path trace query for a multicast tree at a node in the multicast tree;
performing, based on the node being a mid-node in the multicast tree, an upstream trace of network topology of the multicast tree from the mid-node to a head-node of the multicast tree and a downstream trace of network topology of the multicast tree from the mid-node to at least one tail-node;
generating an end-to-end visible topology of the multicast tree based on the upstream trace and the downstream trace; and
providing the end-to-end visible topology of the multicast tree to an observability manager.

13. The tangible, non-transitory, computer-readable medium as in claim 12, wherein the method further comprises:
determining that the node is a mid-node in the multicast tree based on the node being configured as an intermediate node where a multicast stream is received from an upstream node and where the multicast stream is replicated to downstream nodes.

14. The tangible, non-transitory, computer-readable medium as in claim 12, wherein the method further comprises:
determining that the node is a head-node in the multicast tree based on the node being configured as a first hop router where a multicast source is communicatively connected; and
performing, based on the node being the head-node in the multicast tree, a downstream trace of a network topology of the multicast tree from the head-node to the at least one tail-node.

15. The tangible, non-transitory, computer-readable medium as in claim 12, wherein performing the downstream trace of network topology of the multicast tree from the mid-node to the at least one tail-node further comprises:
generating replicant downstream trace requests; and
sending each of the replicant downstream trace requests to a respective downstream node in the multicast tree.

16. The tangible, non-transitory, computer-readable medium as in claim 12, wherein the method further comprises:
determining that the node is a tail-node in the multicast tree based on the node being configured as a last hop router to which a multicast receiver is communicatively connected; and
performing, based on the node being the tail-node, an upstream trace of a network topology of the multicast tree from the tail-node to the head-node.

17. The tangible, non-transitory, computer-readable medium as in claim 12, further comprising:
determining whether a data flow exists at the node for the multicast tree based on a multicast forwarding state existing for the data flow at the node; and
performing the upstream trace and the downstream trace only in response to a determination that the data flow exists at the node.

18. The tangible, non-transitory, computer-readable medium as in claim 12, wherein generating the end-to-end visible topology of the multicast tree based on the upstream trace and the downstream trace comprises:
stitching together a first view of network topology of the multicast tree obtained from the upstream trace from the mid-node to the head-node with a second view of network topology of the multicast tree obtained from the downstream trace from the mid-node to the at least one tail-node.

19. The tangible, non-transitory, computer-readable medium as in claim 12, wherein the multicast path trace query is received from one of: an external client of the node; a local administrator of the node; or a controller.

20. An apparatus, comprising:
one or more network interfaces to communicate with a network;
a processor coupled to the one or more network interfaces and configured to execute one or more processes; and
a memory configured to store a process that is executable by the processor, the process, when executed, configured to:
receive a multicast path trace query for a multicast tree at a device, wherein the device is a mid-node in the multicast tree;
perform, based on the device being the mid-node in the multicast tree, an upstream trace of network topology of the multicast tree from the mid-node to a head-node of the multicast tree and a downstream trace of network topology of the multicast tree from the mid-node to at least one tail-node;
generate an end-to-end visible topology of the multicast tree based on the upstream trace and the downstream trace; and
provide the end-to-end visible topology of the multicast tree to an observability manager.

* * * * *